Figure 1:
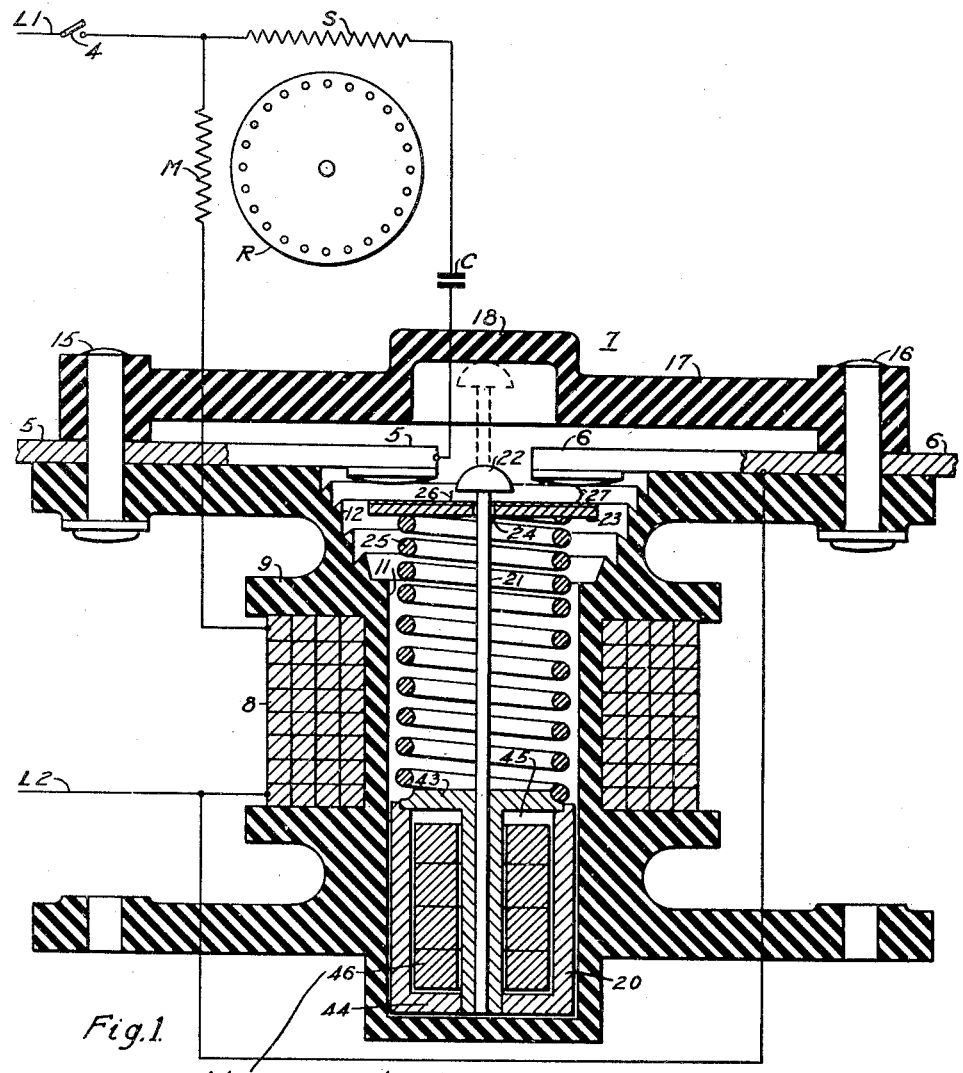

Nov. 15, 1949  H. D. SHAW  2,488,441
ELECTROMAGNETIC NONCHATTERING RELAY
Filed Feb. 6, 1945

Non-magnetic

INVENTOR
Harold D. Shaw.
BY O. B. Buchanan
ATTORNEY

Patented Nov. 15, 1949

2,488,441

UNITED STATES PATENT OFFICE 2,488,441

ELECTROMAGNETIC NONCHATTERING RELAY

Harold D. Shaw, Longmeadow, Mass., assignor to Westinghouse Electric Corporation, East Pittsburgh, Pa., a corporation of Pennsylvania Application February 6, 1945, Serial No. 576,435

7 Claims. (Cl. 200—91)

My invention relates to alternating-current electromagnetic relays, and it has particular relation to undercurrent relays which are particularly well adapted to hold their relay-contacts closed, without chattering or arcing, when the relay is energized with an alternating current well above the dropout point of the relay, and yet the relays being designed so that they will drop out, and open their contacts, when the energizing current falls below a predetermined minimum value. Such relays are useful, for example, for energizing the starting windings of single-phase motors during the starting of the motor, and for opening the starting-winding circuit when the motor comes up to part speed.

Such undercurrent starting-relays commonly have their operating coils connected in series with the main-winding circuit of the motor, and they have their contacts connected in series with the starting-winding circuit of the motor. When the motor is first energized, a heavy inrush of current follows, which causes the starting-relay to instantly pick up its contacts, thus energizing the starting-winding circuit of the motor, so that the motor begins to accelerate. As the motor picks up speed, its current decreases so that the decrease in the current-strength of the motor can be utilized as a means for determining the proper point, during the acceleration of the motor, at which the starting-winding may be deenergized, after which the motor finishes attaining its full speed on its main winding alone.

Heretofore, certain difficulties have attended this type of relay. At the first moment of energization of the motor, the motor inrush-current is at its very maximum strength, and the relay starts from a totally deenergized position, so that the movable member of the relay tends to overtravel, which would result in several violent oscillations of the movable element, which would cause chattering, and bad arcing at the relay-contacts under maximum-current conditions, when the starting-winding current is a maximum, in the relay-contacts, thus causing bad burning of the contacts. This has previously necessitated the provision of a stop for limiting the initial overtravel of the movable element of the relay, and thus breaking up the initial oscillations of the relay.

Several objectionable conditions have been encountered in the operation of such relays, including the arcing of the contacts due to contact-openings or chatterings as a result of the plunger-oscillation under the pulsating force of the operating-coil of the relay during the alternating-current energization of the same during the entire time while the motor is accelerating. A further difficulty has arisen because of a continuous knocking of the movable element of the relay against the stop, making an objectionable chattering noise, during the entire starting-operation of the motor.

An object of my present invention is to avoid the foregoing and other difficulties.

A more specific object of my invention is to provide an alternating-current relay having a vertical-axis solenoid, and a plunger having an upstanding headed plunger-pin extending upwardly therefrom, and loosely guiding a contact-disc which is supported on a helical compression-spring which is normally under no stress, the length of the spring being such that the contact-disc is normally supported in a position below the head of the plunger-pin in the deenergized condition of the solenoid. This normal loose condition of the contact-disc, which is thus not compressed between the head of the plunger-pin and the top of the spring, facilitates the jiggling around of the contact-disc, so that it always makes contacts at different points of the disc; but far more importantly, the normal spacing between the top of the contact-disc and the head of the plunger-pin prevents the plunger-oscillation from causing the downward vibration or oscillating-movement of the plunger-pinhead from striking against the top of the contact-disc, and forcibly knocking open the contacts throughout the starting-operation of the motor. Usually, or quite often, these contacts, once made, stick together with a very slight force, so that they will remain closed, if not forcibly separated, and this provision of a spacing between the head of the plunger-pin and the top of the contact-disc makes it possible for the plunger to oscillate through that much longer amplitude, without affecting the closed contacts of the relay.

A further object of my invention is to provide a variable-rate spring, in a relay of the type described. This is a spring in which a certain proportion of the convolutions are relatively close together, in the normal unstressed condition of the spring, so that, when the spring is compressed, its close convolutions come together, at an intermediate point in the piston-stroke between the contact-making point and the stop-engaging point. In this way, the spring is initially flexible, to permit considerable travel of the plunger, after contact is made, during the contact-closing movement of the plunger, so that thereafter the plunger can oscillate, through a certain amplitude of oscillation, under the pulsating force of the solenoid, without causing the contact to open. However, when the close convolutions of the spring come together, the effective length of the spring is decreased, and the spring is considerably stiffened, enabling it the better to prevent the plunger from knocking or chattering against the stop at the peaks of the current-waves during heavy current-flow through the solenoid of the relay. The initial engagement of the plunger with the stop, during the initial overtravel of the plunger, when it is first energized, makes only a single click and is not objectionable, but the continual chatter of the relay is extremely objectionable if the stop is engaged at every half-cycle during the force-pulsations operating on the relay, and it is this continuous chattering against this stop which is prevented by my variable-rate spring. The use of a variable-rate spring also makes it possible to set the stop a little lower down, thus reducing the overhead room required by the relay.

A further object of my invention is to provide a damping-means, embodied in the plunger, for damping the oscillations of the plunger. This has been found particularly necessary in successfully designing a 25-cycle relay, as distinguished from a 60-cycle relay.

Figure 2:
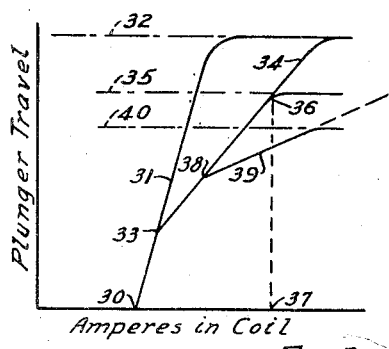
Figure 3:
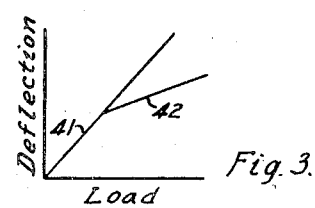

With the foregoing and other objects in view, my invention consists in the circuits, combinations, methods, systems, apparatus and parts hereinafter described and claimed, and illustrated in the accompanying drawing, wherein:

Figure 1 is a diagrammatic view of circuits and apparatus illustrating my invention and its manner of use, including a considerably enlarged, somewhat diagrammatic, cross-sectional view of an illustrative preferred form of embodiment of my relay, and Figs. 2 and 3 are curve-diagrams which will be referred to in the explanation.

In Figure 1, I have shown my invention as being utilized in the starting-control of a small motor, which might be a refrigerator-motor. The motor is shown as a single-phase induction-motor having a main winding M and a starting winding S on its stator-member, and having a squirrel-cage rotor-member R. The main winding M is adapted to be energized, from an alternating-current supply-line L1, L2, through a switch 4. The starting winding S is adapted to be energized in parallel circuit relation to the main winding M, through a capacitor C and the two stationary contacts 5 and 6 of my relay, which is indicated, in its entirety, at 7.

The relay 7 is provided with an operating coil, in the form of a solenoid 8, which is electrically connected in series with the main winding M of the motor. The solenoid 8 is wound on a molded housing-member 9 of a suitable non-conducting, non-magnetizable material. The housing-member 9 is provided with a cylindrical vertical cup-like perforation 11, which is enlarged, at the top, with a jagged-sided enlargement 12, providing an irregular surface, the irregularities of which increase the surface-creepage insulation. The two stationary contact-members 5 and 6 of the relay are mounted on the top of the housing 9, to which they are tightly secured, as by means of rivets 15 and 16. The rivets 15 and 16 may also be utilized to secure a molded top-member 17 in place. The molded top-member 17 has a raised central portion 18, the bottom of which serves as a stop-member, as will be subsequently described.

Disposed in the bottom of the vertical depression 11 in the housing 9, is the magnetizable plunger 20 of my relay, this plunger normally resting well below the center-line of the solenoid 8, so that the plunger will have a considerable upward distance of travel, when the solenoid 8 is energized, thus tending to draw up the plunger into a center position relative to the solenoid. This plunger 20 has an upstanding, headed, plunger-pin 21, the bottom of which is securely attached to the plunger 20. The top of the plunger-pin 21 extends axially upwardly, and terminates in a head 22. Loosely guided, in sliding relationship to the plunger-pin 21, is a contact-disc 23, having a central perforation 24 through which the plunger-pin 21 passes. The contact-disc 23 rests on top of a helical compression-spring 25, which in turn rests on the top of the plunger 20.

In accordance with my present invention, the spring 25 is normally under no stress, except for the relatively slight weight of the contact-disc 23, and the length of the spring is such that the contact-disc 23 is normally supported in a position below the head 22 of the plunger-pin 21 in the deenergized condition of the solenoid 8, leaving a space 26 between the top of the contact-disc 23 and the bottom of the head 22. The contact-disc 23 is also normally, that is, in the open or deenergized position of the relay, spaced, by a space 27, below the bottoms of the stationary contact-members 5 and 6.

The parts are normally in the deenergized position shown in the drawing. When the motor-switch 4 is closed, a heavy inrush of current flows through the main winding M of the motor, thus strongly energizing the solenoid 8 of my relay. The magnetic field of the solenoid 8 strongly attracts the plunger 20, developing a force tending to lift the plunger so that the centerline of the plunger is coincident with the centerline of the solenoid. At an early portion of the upward stroke of the plunger 20, the contact-disc 23 engages the two stationary contact-members 5 and 6, thus completing the circuit of the starting-winding S of the motor. The plunger 20 keeps on rising, thereafter putting the spring 25 in compression, and usually the movement is so violent that the plunger overtravels, until the head 22 of the plunger-pin 20 engages the bottom of the central elevated portion 18 of the top-member, which serves as a stop. This stop should be so positioned that the upward movement of the plunger 20 is arrested before the centerline of the plunger reaches as high as the centerline of the solenoid 8, that is, before the pull of the solenoid reverses and tends to draw the plunger down again, because the solenoid, whatever the polarity of its energization, always tends to draw the plunger into a position which is centered with respect to the solenoid.

The plunger-movement just described takes place very quickly. The stop 18 serves the purpose of interrupting the movement of the plunger, so as to break up its free oscillation as a result of its overshooting beyond its steady-state position, thus preventing it from swinging down again, far enough to reopen the contacts 5—23—6.

As soon as the starting-winding circuit of the motor is closed, by the closure of the contacts 5—23—6, the motor commences to start, and this starting-operation consumes a considerable number of cycles, usually a few seconds, depending upon the loading of the motor. During this time, the motor is accelerating, and as the motor accelerates, its initial current-inrush begins to subside. When the motor has achieved a certain proportion of its normal running speed, it is desirable for the relay to respond to the reduced current-flow, by dropping the plunger 20 and opening the contacts 5—23—6. Meanwhile, a double-frequency pulsating force is operating on the plunger 20, dropping to zero each time the solenoid-current passes through zero. The inertia of the plunger is sufficient so that it does not altogether follow these force-pulsations, so that the plunger 20 does not drop altogether to the bottom of its path of movement each time the force drops to zero, but the plunger does have a certain amount of oscillation, up and down, as a result of this variable force exerted by the solenoid 8, as a result of its alternating-current energization.

It is at this stage of the operation that the spacing 26 between the top of the contact-disc 23 and the underside of the head 22 of the plunger-pin 21 comes into play, to permit the downward strokes of the plunger-oscillations to carry the plunger just that much further down, before the pinhead 22 strikes the top of the contact-disc 23 and forcibly knocks the contact-disc 23 away from the stationary contact-members 5 and 6, thus breaking any slight adhesion, or sticking, or very light welding-contact, between the contact-disc 23 and the stationary contact-members 5 and 6. The pinhead spacing 26 thus provides a means for easily producing a design which avoids the continuous chattering of the contacts 5—23—6 during the entire starting operation of the motor, which would be the source of a considerable burning of the contact-members, if it were permitted to occur, particularly during the initial portion of the starting period, during which the starting-current is the heaviest.

As the motor-current subsides, during the starting-operation of the motor, the dropout point of the relay is finally reached, that is, the point at which the current-strength is no longer sufficient to cause the solenoid to hold up the plunger 20. Inevitably, as the current reaches this dropout value, there may be a few fluttering openings of the contacts 5—23—6, before these contacts finally open and remain open, but this transitory condition is very short, the current-strength is small, and the amount of damage done by such fluttering of the contacts is not very great, and is usually easily tolerated, and even expected.

There is another feature of my invention, in addition to the spacing 26 between the top of the contact-disc 23 and the pinhead 22. This feature, which is always preferable, although perhaps not obligatory, is the utilization of a variable-rate spring 25. It will be noted, from the illustration in Fig. 1, that the lower portion of the total number of convolutions of the spring 25 are normally spaced a considerable distance apart, while the upper four or five convolutions are normally spaced closer together. When the spring compresses, during the upward stroke of the plunger 20, these close upper convolutions close together, into solid contact with each other, thus reducing the effective length of the spring and the effective number of convolutions thereof, thereby considerably stiffening the spring.

Reference to Fig. 2 will aid in the understanding of the operation of the relay, with the pinhead-spacing 26, and with the normally unloaded spring 25, either with or without a change in the flexibility of the spring during the movement of the plunger. Fig. 2 shows the steady-state position which the plunger would assume if the solenoid were energized with a steady direct current, which is slowly changed from one value to another. The plunger will not lift at all until the amount of current in the coil 8 reaches a certain value, which is indicated by the point 30. A very slight increase in the current thereafter will cause the plunger to rise, on a steeply rising line 31, showing the plunger-position in terms of the current or amperes in the solenoid-coil 8. As the solenoid-current increases, the plunger is finally drawn up to the centerline-position 32 of the coil, that is, with the center of the plunger exactly in line with the center of the coil. The coil then holds the plunger in that position. The curve 31 in Fig. 2 shows what would happen if the contact-disc 23 were not present, and if the stop 18 were not present.

After the plunger has moved through a relatively small portion of its movement, represented by the contact-spacing 27 in Fig. 1, the contact-disc 23 of Fig. 1 makes contact with the stationary contact-members 5 and 6, and thereafter, as the plunger 20 continues to move, the pull of the solenoid 8 must overcome, not only the gravity or weight of the plunger 20, but also the compression of the spring 25. In Fig. 2, the contact-making point is indicated at 33, in the curve 31, and thereafter the plunger moves up, in response to increasing values of current, along a new line 34, which does not slope as steeply as the line 31. In other words, the line 34 indicates that the solenoid-current must increase to somewhat higher values, before the plunger is drawn up to the centerline-position 32 of the coil.

As described in connection with Fig. 1, however, the top central portion 18 of the casing serves as a stop for limiting the upward movement of the plunger 20 before the plunger reaches the coil-centerline-position 32 of Fig. 2. The position of this stop may be somewhat as indicated at 35 in Fig. 2, so that the plunger travels from the starting-point 30, first along the curve 31 to the point 33, then along the curve 34 to the point 36, and then the plunger becomes stationary as indicated by the stop-line 35, no matter how much further the solenoid-current is increased.

In actual operation, the solenoid-current is an alternating current, not a direct current as has been thus far supposed, in the explanation of Fig. 2. The maximum value of the initial inrush-current of the motor is such as to cause the solenoid to have an effective lifting-force which is less than the steady-state or direct-current value which is indicated at 37 in Fig. 2, corresponding to the current-value necessary to bring the plunger 20 of Fig. 1 into contact with the stop 18, or rather to bring the head 22 of the plunger-pin 21 into contact with the stop 18. However, during the transient of the sudden energization of the solenoid 8, when the motor-switch 4 is first closed, the plunger 20 is lifted with such rapidity that it overshoots its steady-state position, and comes into contact with the stop 18, as indicated in Fig. 2 by the line 35. The stop 18 thus checks the first overshooting of the plunger, beyond its normal pulsating or oscillating position, and the stop thus checks the violence of the initial swing or oscillation of the plunger.

Thereafter, as the magnetic force pulsates from a maximum to zero, during each succeeding half-cycle of the solenoid-current, the plunger oscillates somewhat in position, moving more or less closely in conformity with the portion of the curve 34 between the points 33 and 36 in Fig. 2, usually keeping below the maximum point 36, with oscillations gradually decreasing in amplitude, and falling down lower on the curve, as the solenoid-current decreases. This is the period of time when the fluttering of the relay-contacts would cause severe arcing, and this is the period of the operation in which the pinhead-spacing 26 of Fig. 1 is effective in preventing the downward strokes of the oscillation of the plunger from bringing the head 22 of the plunger-pin 21 down into contact with the top of the movable contact-disc 23.

Fig. 2 also shows the effect of a variable-rate spring 25 of Fig. 1. Referring again to Fig. 2, and again assuming an experiment utilizing a gradually changed direct current for energizing the solenoid-coil 8, if a variable-rate spring 25 is utilized in Fig. 1, then, at a certain intermediate point 38 in the curve 34, the spring-stiffness will increase, so that, from that point on, for any further current-increases, a new curve 39 will be followed. The relatively flexible portion of the spring, effective between the points 33 and 38 on the curve 34, is useful in the better prevention of a chattering contact-opening during the plunger-oscillation, because the flexibility of the spring makes it possible for the spring to be compressed through a considerable distance, equal to the difference between the vertical heights of the points 38 and 33 in Fig. 2, before the increased stiffness of the spring becomes effective.

The stiffer portion of the spring-operation, as indicated by the line 39 in Fig. 2, comes into play more particularly during the initial overswing portion of the plunger-travel, when the high upward velocity of the plunger and its inertia combine to carry it higher than the position which is capable of being steadily maintained by the solenoid-current, which never has an effective value in excess of that which is indicated at 37 in Fig. 2, usually not as high, with some factor of safety being allowed. The relatively stiff portion 39 of the spring-operation thus serves to check this unwanted initial overtravel of the plunger during the initial transient swing, thus making it possible to set the stop 18 a little lower down, as indicated by the line 40 in Fig. 2, thus making the relay require less overhead room than before, or, at the same stop-position utilized as indicated at 35, enabling the relay to be rated at a higher effective maximum-current rating than that which is indicated at 37.

The variable-rate spring-operation is indicated in Fig. 3, wherein the spring-deflection is plotted against the spring-load. In Fig. 3, the first portion 41 of the curve indicates conditions when the spring 25 first begins to be compressed, while the less steeply sloped line 42 indicates the spring-deflection conditions on heavier loads, which still further compress the spring, after its closely spaced turns have closed solidly into contact with each other.

In Fig. 1, I also show another feature of my invention, which has been found to be a practical necessity, if the relay is to work successfully on 25 cycles, although this additional feature is not usually needed for 60-cycle operation. I refer to a damping means for the plunger 20. As shown in Fig. 1, the plunger 20 is made hollow, in two parts 43 and 44 of magnetizable material, these parts being secured together, and the plunger-pin 21 being secured to one of said parts. Between the two plunger-parts 43 and 44, is an annular space 45, in which is disposed a fairly closely fitting, annularly or cylindrically shaped, non-magnetizable weight or weights 46, some room being provided for the weight or weights 46 to move slightly, upwardly and downwardly within the cavity 45 of the plunger 20.

Since the weight 46 is non-magnetizable, it is not drawn upwardly by the solenoid, during the initial period of energization of the solenoid, but it remains resting on the bottom of the plunger-cavity 45, while the plunger 20 is being carried upwardly, when the relay is first energized. Then, when the plunger-pinhead 22 strikes the stop 18, and also, in subsequent half-cycles when the plunger-lifting force of the solenoid becomes zero, the inertia of the weight 46 causes it to rise and fall in the plunger-cavity 45, out of synchronism with the oscillation of the plunger, thus damping the plunger-oscillation because of the friction created by the relative movement of the weight 46 within the cavity 45. The expedient is useful in cases where it is not feasible to make the natural period of the plunger-system sufficiently long to avoid plunger-oscillations of a magnitude that would cause fluttering opening of the spring-contacts 5—23—6.

While I have described my invention in a single preferred form of embodiment, I wish it to be understood that I am not limited altogether to this precise form, which is intended to be illustrative rather than a strict limitation upon the precise form of embodiment of my invention. I desire, therefore, that the appended claims shall be accorded the broadest construction consistent with their language.

I claim as my invention:

1. An alternating-current electromagnetic relay comprising a solenoid having a vertical axis, a magnetizable plunger normally disposed below the centerline of the solenoid in position adapting it to be drawn up toward a centered position within the solenoid when the latter is energized, said plunger having an upstanding, headed plunger-pin extending axially upwardly above it, a contact-disc having a central perforation through which the plunger-pin loosely extends, in guiding, sliding relationship, a helical compression-spring resting on the top of the plunger and supporting said contact-disc, said spring being normally under no stress except for the relatively slight weight of the contact-disc, the length of the spring being such that the contact-disc is normally supported in a position below the head of the plunger-pin in the deenergized condition of the solenoid, a plurality of stationary contact-members disposed slightly above the normal position of the contact-disc, whereby said contact-disc engages said stationary contact-members in an early portion of the stroke of the piston, when the latter is raised by the energization of the solenoid, and a stop for limiting the upward movement of the plunger in a later portion of its stroke and before the plunger reaches a centered position with respect to the solenoid, whereby the stop limits the overtravel, and breaks up the consequent oscillation, of the plunger when and after it is first strongly lifted from its normal position by a sudden, strong energization of the solenoid, the spring having sufficient flexibility to permit considerable travel of the plunger after contact is made, whereby the plunger-oscillation, under the pulsating force of the solenoid during the rated alternating-current energization of the latter, does not open the contact except at a current-strength near the dropout point of the relay, and yet the spring having sufficient stiffness to prevent a chattering engagement of the stop after the initial plunger-overtravel at the rated maximum current of the relay.

2. The invention as described in claim 1, characterized by said spring being a variable-rate spring, having a portion of its total number of convolutions sufficiently close together, in the normal condition of the spring when the solenoid is unenergized, so that said close convolutions come together at an intermediate point in the piston-stroke between the contact-making point and the stop-engaging point, whereby the initial flexibility of the spring the better prevents contact-opening during the plunger-oscillation, and whereby the final stiffness of the spring the better prevents stop-engagement after the initial overtravel of the plunger.

3. The invention as defined in claim 1, characterized by said plunger having a magnetizable part and a relatively frictionally movable non-magnetizable part thereon, whereby the inertia of the relatively movable part serves to dampen the plunger-oscillation.

4. The invention as described in claim 1 characterized by said spring being a variable-rate spring, having a portion of its total number of convolutions sufficiently close together, in the normal condition of the spring when the solenoid is unenergized, so that said close convolutions come together at an intermediate point in the piston-stroke between the contact-making point and the stop-engaging point, whereby the initial flexibility of the spring the better prevents contact-opening during the plunger-oscillation, and whereby the final stiffness of the spring the better prevents stop-engagement after the initial overtravel of the plunger, and further characterized by said plunger having a magnetizable part and a relatively frictionally movable non-magnetizable part thereon, whereby the inertia of the relatively movable part serves to dampen the plunger-oscillation.

5. An alternating-current electromagnetic relay comprising a solenoid having a vertical axis, a magnetizable plunger normally disposed below the center-line of the solenoid in position adapting it to be drawn up toward a centered position within the solenoid when the latter is energized, said plunger having an upstanding, headed plunger-pin extending axially upwardly above it, a movable contact-member having a central perforation through which the plunger-pin loosely extends, in guiding, sliding relationship, a helical compression-spring resting on the top of the plunger and supporting said movable contact-member, a plurality of stationary contact-members disposed slightly above the normal position of the movable contact-member, whereby said movable contact-member engages said stationary contact-members in an early portion of the stroke of the piston, when the latter is raised by the energization of the solenoid, and a stop for limiting the upward movement of the plunger in a later portion of its stroke and before the plunger reaches a centered position with respect to the solenoid, whereby the stop limits the overtravel, and breaks up the consequent oscillation, of the plunger when and after it is first strongly lifted from its normal position by a sudden, strong energization of the solenoid, the spring being a variable-rate spring, having a portion of its total number of convolutions sufficiently close together, in the normal condition of the spring when the solenoid is unenergized, so that said close convolutions come together at an intermediate point in the piston-stroke between the contact-making point and the stop-engaging point, whereby the initial flexibility of the spring better prevents contact-opening during the plunger-oscillation, under the pulsating force of the solenoid, during the rated alternating-current energization of the latter, and whereby the final stiffness of the spring the better prevents a chattering engagement of the stop after the initial plunger-overtravel at the rated maximum current of the relay.

6. An alternating-current electromagnetic relay comprising a solenoid having a vertical axis, a magnetizable plunger normally disposed below the centerline of the solenoid in position adapting it to be drawn up toward a centered position within the solenoid when the latter is energized, said plunger having an upstanding, headed plunger-pin extending axially upwardly above it, a movable contact-member having a central perforation through which the plunger-pin loosely extends, in guiding, sliding relationship, a helical compression-spring resting on the top of the plunger and supporting said movable contact-member, a plurality of stationary contact-members disposed slightly above the normal position of the movable contact-member whereby said movable contact-member engages said stationary contact-members in an early portion of the stroke of the piston when the latter is raised by the energization of the solenoid, and a stop for limiting the upward movement of the plunger in a later portion of its stroke and before the plunger reaches a centered position with respect to the solenoid, whereby the stop limits the overtravel, and breaks up the consequent oscillation, of the plunger when and after it is first strongly lifted from its normal position by a sudden, strong energization of the solenoid, the spring having sufficient flexibility to permit considerable travel of the plunger after contact is made, whereby the plunger-oscillation, under the pulsating force of the solenoid during the rated alternating-current energization of the latter, does not open the contact except at a current-strength near the dropout point of the relay, and yet the spring having sufficient stiffness to prevent a chattering engagement of the stop after the initial plunger-overtravel at the rated maximum current of the relay, characterized by said plunger having a magnetizable part and a relatively frictionally movable non-magnetizable part thereon, whereby the inertia of the relatively movable part serves to dampen the plunger-oscillation.

7. An alternating-current electromagnetic relay comprising a solenoid having a vertical axis, a magnetizable plunger normally disposed below the centerline of the solenoid in position adapting it to be drawn up toward a centered position within the solenoid when the latter is energized, said plunger having an upstanding, headed plunger-pin extending axially upwardly above it, a movable contact-member having a central perforation through which the plunger-pin loosely extends, in guiding, sliding relationship, a helical compression-spring resting on the top of the plunger and supporting said movable contact-member, said spring being normally under no stress except for the relatively slight weight of the movable contact-member, the length of the spring being such that the movable contact-member is normally supported in a position below the head of the plunger-pin in the deenergized condition of the solenoid, a plurality of stationary contact-members disposed slightly above the normal position of the movable contact-member, whereby said movable contact-member engages said stationary contact-members in an early portion of the stroke of the piston, when the latter is raised by the energization of the solenoid, and a stop for limiting the upward movement of the plunger in a later portion of its stroke and before the plunger reaches a centered position with respect to the solenoid, whereby the stop limits the overtravel, and breaks up the consequent oscillation, of the plunger when and after it is first strongly lifted from its normal position by a sudden, strong energization of the solenoid, the spring having sufficient flexibility to permit considerable travel of the plunger after contact is made, whereby the plunger-oscillation, under the pulsating force of the solenoid during the rated alternating-current energization of the latter, does not open the contact except at a current-strength near the dropout point of the relay, and yet the spring having sufficient stiffness to prevent a chattering engagement of the stop after the initial plunger-overtravel at the rated maximum current of the relay.

HAROLD D. SHAW.

REFERENCES CITED

The following references are of record in the file of this patent:

UNITED STATES PATENTS

| Number | Name | Date |
|---|---|---|
| 792,859 | Sundh et al. | June 20, 1905 |
| 983,976 | Carpenter | Feb. 14, 1911 |
| 1,239,114 | Kroger | Sept. 4, 1917 |
| 1,793,858 | Lake | Feb. 24, 1931 |
| 1,995,620 | Monroe | Mar. 26, 1935 |
| 2,026,415 | Champlin | Dec. 31, 1935 |
| 2,170,961 | Borgkvist | Aug. 29, 1939 |
| 2,238,154 | Borgkvist | Apr. 15, 1941 |
| 2,387,264 | Holland | Oct. 23, 1945 |

FOREIGN PATENTS

| Number | Country | Date |
|---|---|---|
| 152,551 | Germany | June 24, 1904 |